UNITED STATES PATENT OFFICE 2,142,193

COLD SEALING MASS

Franzjakob Janz, Freiburg in Breisgau, Germany

No Drawing. Application March 9, 1936,
Serial No. 67,910

5 Claims. (Cl. 106—23)

A cold sealing mass which yields an elastic seal is already known, in which acetyl-cellulose is used as the basic material and methylene chloride as solvent. In addition to a small proportion of filling material, this cold sealing mass contained softeners in amount equal to the acetyl-cellulose. The mass rapidly hardened, kept well in tubes, was resistant to pressure and impact owing to its high content of softeners and low content of filling material, and did not become sticky at high surrounding temperatures. It did not satisfy certain regulations however because a seal made of this mass could in many cases be removed as a whole from an envelope of smooth paper, so that it was possible to open and reclose a letter without leaving easily recognizable traces.

The need therefore arose to produce a cold sealing mass which could be supplied commercially in tubes and which produced a brittle seal. To achieve this end, hitherto resins have mostly been recommended. It has been found however that if resin is admixed with the above described mass, the material adheres to the impressing instrument even if the latter is previously moistened. The brittleness of the sealing mass could also be increased by raising the content of filling material. But the resistance to breakage and shocks and also the adhesion of the seal were thereby reduced. These faults could not be overcome by increase in the content of softeners because this addition again raises the elasticity.

It has been found unexpectedly that a mass of satisfactory qualities can be obtained by adding caoutchouc chloride to a mixture of acetyl-cellulose with a very considerable proportion of fillers and only a small proportion of softeners. Caoutchouc chloride dissolves in methylene chloride and considerably increases the adhesion of the sealing mass without increasing its elasticity.

Heavy spar which is otherwise much used is not suitable as a filler for the purpose in view because it makes the mass too fragile, apart from the fact that it makes it undesirably heavy. Asbestos meal even in large quantities has been found very suitable as a filler. Even if the fibres are very short, it suffices to give the sealing mass just that cohesion which is necessary. At the same time it is specifically very light and as a waste product is very cheap.

To dissolve the caoutchouc chlorine directly in methylene chloride presents difficulties. A uniform sealing mass can be obtained however in a convenient manner by proceeding as follows:—

The asbestos meal is first mixed with the acetyl cellulose which comes commercially in coarse flakes and is advantageously finely ground for the present purpose. Dyestuffs (advantageously dyestuffs without fillers), softeners such as triphenylphosphate and ethylacetanilide, and caoutchouc chloride, in powder form are then admixed with the basic mixture. The mixture is then put into a closed stirrer and the solvent advantageously consisting of methylene chloride and methyl-alcohol run in.

It has already been proposed to add small quantities of ethyl alcohol to methylene chloride. It has been found that the addition of methyl alcohol acts better than ethyl alcohol, in that the sealing mass made with this addition shrinks less in drying, which may perhaps be ascribed to the more rapid evaporation of the methyl alcohol, or perhaps to the particular solvent qualities of methyl alcohol which lie between those of ethyl alcohol and water, with regard to the acetyl-cellulose and the caoutchouc chloride.

After about three hours stirring the mass is homogeneous and plastic. It does not adhere to a moistened seal impressing instrument, shows a slight gloss which it owes to the caoutchouc chloride content, has a considerably greater adhesive power than the known elastic cold sealing mass, and has the resistance to shocks and blows required by the authorities but is yet so brittle that it cannot be removed as a whole from its support without leaving visible traces.

Hardening takes place so rapidly that letters sealed with this mass can be piled on one another after 3–4 minutes without sticking together or the impressions being destroyed. Distortion of the impression does not take place during drying. Owing to the use of asbestos meal the seals are only about one third the weight of seals made with the usual hot sealing wax, which is highly desirable as regards cost of postage.

In order to produce a cold sealing mass according to the invention, the following procedure can for example be adopted. 8.7 parts of asbestos meal are mixed with 2.5 parts of ground acetyl-cellulose, 1.3 parts of colouring matter, 0.4 part of ethylacetanilide, 0.4 part of triphenylphosphate and 0.9 part of caoutchouc chloride; 10.2 parts of methylene chloride and 0.6 part of methyl alcohol are then added to the mixture in a closed stirrer.

After about three hours stirring the whole is in the form of a uniform paste which can be packed in collapsible tubes for use.

What I claim is:—

1. A cold sealing mass in the form of uniform paste comprising the following ingredients in substantially the following proportions:—8.7 parts of asbestos meal, 2.5 parts of acetylcellulose, 1.3 parts of colouring matter, 0.4 part of ethylacetanilide, 0.4 part of triphenylphosphate, 0.9 part of caoutchouc chloride. 10.2 parts of methylene chloride and 0.6 part of methyl alcohol.

2. A cold sealing mass remaining plastic in a closed container and hardening within a few minutes to a brittle mass when exposed to the atmosphere, comprising an intimate mixture of (1) insoluble pulverulent material, (2) acetyl cellulose, (3) caoutchouc chloride, (4) softener, (5) methylene chloride, the substance (1) forming the main constituent of the solid substance, the substance (2) being the main constituent of the remaining solid substances, the substances (3) and (4) being present in small quantities and the substance (5) amounting to at most about ⅔ of the solid substance.

3. A cold sealing mass as set forth in claim 2 wherein the insoluble pulverulent material forming the main constituent of the solid substances consists of asbestos meal.

4. A cold sealing mass as set forth in claim 2 wherein the softener consists of ethylacetanilide and triphenylphosphate.

5. A method for preparing a cold sealing mass remaining plastic in a closed container and hardening within a few minutes to a brittle mass when exposed to the atmosphere, comprising mixing (1) pulverulent insoluble material with (2) acetyl cellulose and (3) caoutchouc chloride, the latter being also in powdered form, the said substances being so proportioned that the insoluble material (1) forms the main constituent and the amount of caoutchouc chloride (3) is smaller than that of acetyl cellulose (2), then stirring the mixture with methylene chloride and small amounts of softeners in a closed stirrer into a uniform paste.

FRANZJAKOB JANZ.